United States Patent
Slyter et al.

(10) Patent No.: US 10,737,788 B2
(45) Date of Patent: Aug. 11, 2020

(54) SYSTEMS AND METHODS FOR ADAPTIVELY POSITIONING A CROSS-AISLE CURTAIN HEADER ASSEMBLY WITHIN A VEHICLE

(71) Applicant: THE BOEING COMPANY, Chicago, IL (US)

(72) Inventors: Kenneth Michael Slyter, Kent, WA (US); Linh Hong Nguyen, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 379 days.

(21) Appl. No.: 15/788,892

(22) Filed: Oct. 20, 2017

(65) Prior Publication Data

US 2019/0118947 A1  Apr. 25, 2019

(51) Int. Cl.
*A47H 1/18* (2006.01)
*B64D 11/00* (2006.01)
*A47H 1/10* (2006.01)

(52) U.S. Cl.
CPC ........... *B64D 11/0023* (2013.01); *A47H 1/18* (2013.01); *A47H 1/10* (2013.01)

(58) Field of Classification Search
CPC ...... B64D 11/0023; A47H 1/022; A47H 1/08; A47H 1/12; A47H 1/122; A47H 1/124; A47H 1/18; A47H 1/14; A47H 1/142; A47H 1/144; E05D 15/0652; Y10T 16/373; Y10T 16/379

See application file for complete search history.

(56) References Cited

U.S. PATENT DOCUMENTS

| | | | |
|---|---|---|---|
| 2,294,295 A | | 8/1942 | Hankins |
| 2,542,964 A | * | 2/1951 | Koett ................. A47G 25/0692 211/123 |
| 2,605,064 A | | 7/1952 | Davis |
| 2,617,571 A | * | 11/1952 | Hart ........................ B60R 7/10 224/313 |
| 2,658,759 A | | 11/1953 | Flory |

(Continued)

FOREIGN PATENT DOCUMENTS

| | | | |
|---|---|---|---|
| AU | 523380 | | 8/1982 |
| CA | 2914149 A1 | * | 6/2016 ......... B64D 11/0023 |

(Continued)

*Primary Examiner* — Johnnie A. Shablack
(74) *Attorney, Agent, or Firm* — The Small Patent Law Group LLC

(57) ABSTRACT

A curtain header assembly is configured to be selectively positioned within an internal cabin of a vehicle. The curtain header assembly includes a main spanning bracket having a first end and a second end that is opposite from the first end. The main spanning bracket connects to a curtain track that retains one or more curtain couplings that are configured to moveably secure a curtain to the main spanning bracket. A first connection arm extends from the first end of the main spanning bracket, and is configured to be removably secured to a first fitting secured to a first fixed structure within the internal cabin. A second connection arm extends from the second end of the main spanning bracket, and is configured to be removably secured to a second fitting secured to a second fixed structure within the internal cabin.

22 Claims, 12 Drawing Sheets

(56) References Cited

U.S. PATENT DOCUMENTS

| | | | |
|---|---|---|---|
| 2,710,731 A | 6/1955 | Bright | |
| 3,892,378 A * | 7/1975 | Lane | F16L 3/00 |
| | | | 248/71 |
| 4,088,322 A | 5/1978 | Nikoden | |
| 4,102,381 A | 7/1978 | Bratschi | |
| 4,597,549 A * | 7/1986 | Ryan | B64C 1/10 |
| | | | 160/127 |
| 4,599,763 A * | 7/1986 | Toder | A47H 13/01 |
| | | | 16/232 |
| 4,639,031 A * | 1/1987 | Truckenbrodt | B60P 3/205 |
| | | | 160/84.01 |
| 5,086,540 A * | 2/1992 | Schumacher | B64D 11/0023 |
| | | | 16/87.4 R |
| 5,337,979 A * | 8/1994 | Bales | B64D 11/0696 |
| | | | 244/118.1 |
| 5,577,358 A * | 11/1996 | Franke | B64D 11/0023 |
| | | | 244/118.5 |
| 6,189,831 B1 | 2/2001 | Asai | |
| 6,523,779 B1 | 2/2003 | Michel | |
| 7,530,529 B2 * | 5/2009 | Bock | B64D 11/0023 |
| | | | 244/118.5 |
| 7,641,426 B2 * | 1/2010 | Stubbe | B64D 11/0696 |
| | | | 410/104 |
| 8,262,022 B2 | 9/2012 | Young | |
| 8,517,307 B2 * | 8/2013 | Saint-Jalmes | B64D 11/0023 |
| | | | 160/102 |
| 8,556,212 B2 | 10/2013 | Breuer | |
| 8,684,308 B2 | 4/2014 | Warner | |
| 8,801,347 B2 * | 8/2014 | Daouk | B64D 11/0023 |
| | | | 410/105 |
| 8,814,089 B2 * | 8/2014 | Chandler | B64D 11/0023 |
| | | | 244/118.5 |
| 8,814,095 B2 * | 8/2014 | Neumann | B61D 17/048 |
| | | | 244/131 |
| 8,869,865 B2 * | 10/2014 | Roach | B64D 11/0023 |
| | | | 160/84.04 |
| 9,027,880 B2 * | 5/2015 | Breuer | B64D 11/0023 |
| | | | 105/323 |
| 9,108,734 B2 * | 8/2015 | Chandler | B64D 11/0023 |
| 9,139,301 B2 * | 9/2015 | Slyter | B64D 11/0023 |
| 9,463,877 B2 * | 10/2016 | Ulbrich-Gasparevic | |
| | | | B64D 11/0023 |
| 9,499,271 B2 | 11/2016 | Walton | |
| 9,856,695 B2 * | 1/2018 | Leadens, II | B64D 11/0023 |
| 10,231,563 B2 * | 3/2019 | Colacecchi | A47H 1/04 |
| 2007/0006377 A1 * | 1/2007 | Moore | A47K 3/38 |
| | | | 4/558 |
| 2007/0006378 A1 * | 1/2007 | Moore | A47K 3/38 |
| | | | 4/558 |
| 2007/0018044 A1 * | 1/2007 | Bock | B64D 11/0023 |
| | | | 244/118.5 |
| 2008/0313964 A1 * | 12/2008 | Michel | B64D 11/0023 |
| | | | 49/409 |
| 2012/0234976 A1 * | 9/2012 | Neumann | B61D 17/048 |
| | | | 244/131 |
| 2012/0273613 A1 * | 11/2012 | Ulbrich-Gasparevic | |
| | | | B64D 11/0023 |
| | | | 244/118.1 |
| 2014/0158310 A1 * | 6/2014 | Slyter | B64D 11/0023 |
| | | | 160/124 |
| 2016/0059964 A1 * | 3/2016 | Breuer | B64D 11/003 |
| | | | 244/118.5 |
| 2016/0115721 A1 * | 4/2016 | Leadens, II | E06B 9/362 |
| | | | 244/129.5 |
| 2016/0297525 A1 * | 10/2016 | Walton | B64D 11/0023 |
| 2018/0057168 A1 * | 3/2018 | Holtorf | A47H 1/06 |
| 2018/0194472 A1 * | 7/2018 | Tremblay | B64C 1/1438 |
| 2018/0346123 A1 * | 12/2018 | Sexton | B64D 11/0023 |
| 2018/0346124 A1 * | 12/2018 | Radacovici | B64D 11/003 |
| 2019/0106213 A1 * | 4/2019 | Minyard | B64D 11/0023 |
| 2019/0118947 A1 * | 4/2019 | Slyter | A47H 1/18 |

FOREIGN PATENT DOCUMENTS

| | | | | |
|---|---|---|---|---|
| CN | 102774500 A | * | 11/2012 | |
| EP | 0407767 B1 | * | 7/1993 | B64D 11/0023 |
| EP | 1619120 | | 1/2006 | |
| EP | 2520490 A1 | * | 11/2012 | B64D 11/0023 |
| EP | 2406115 B1 | * | 10/2013 | B64D 11/0023 |
| EP | 3401218 A1 | * | 11/2018 | B64D 11/0023 |
| WO | WO-2007054534 A2 | * | 5/2007 | B64D 11/0023 |
| WO | WO-2011092640 A1 | * | 8/2011 | B64D 11/0023 |
| WO | WO 2013/142660 | | 9/2013 | |
| WO | WO-2017068484 A1 | * | 4/2017 | B64D 11/003 |

* cited by examiner

SYSTEMS AND METHODS FOR ADAPTIVELY POSITIONING A CROSS-AISLE CURTAIN HEADER ASSEMBLY WITHIN A VEHICLE

FIELD OF EMBODIMENTS OF THE DISCLOSURE

Embodiments of the present disclosure generally relate to systems and methods for positioning a cross-aisle curtain header assembly within a vehicle, such as a commercial aircraft.

BACKGROUND OF THE DISCLOSURE

Commercial aircraft typically include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Each passenger section may be separated from an adjacent passenger section by a cabin transition area, which may include one or more monuments, such as walls, work stations, or the like. Curtains may be used to separate sections of an aircraft for a variety of reasons, including class separation, privacy, work areas, and the like. For example, a cabin transition area between a business class section and a coach section may include a curtain assembly within an aisle and curtain assemblies above and behind seat backs on either side of the aisle. A curtain moveably connected to a curtain track that spans over any aisle may be selectively opened and closed. When opened, such as during a boarding process, passengers may pass from one section to another section, such as from the business class section to the coach section. During flight, the curtain may be closed to indicate that passengers are not allowed to pass (or at least discouraged from passing) from the coach section into the business class section.

Known class or section dividers include a moveable curtain positioned within an aisle and lateral curtains extending from the aisle to outboard interior walls within a cabin. The curtain assemblies are typically fixed in position. In particular, a curtain track (to which a curtain is moveably coupled) is typically fixed between two attachment points within the internal cabin. In order to reposition the curtain track, portions of monuments, stowage bins, and/or the like are typically removed to expose fasteners. Aircraft technicians, such as mechanics, then remove the fasteners and mounting structures and secure the assemblies at another position. As can be appreciated, the process of repositioning curtain tracks is time and labor intensive.

However, between or even during flights, aircraft staff may opt to reconfigure the sections onboard an aircraft. For example, between flights, aircraft crew may opt to expand one section onboard a subsequent flight, depending on the number of type of passenger seats for the subsequent flight. Nevertheless, there may insufficient time for aircraft technicians to board the aircraft and move the section dividers, such as the curtains within the aisles.

SUMMARY OF THE DISCLOSURE

A need exists for a curtain assembly that may be quickly and efficiently repositioned within an interior cabin of an aircraft. Further, a need exists for a curtain assembly that may be quickly and easily moved by flight attendants between flights of an aircraft.

With those needs in mind, certain embodiments of the present disclosure provide a curtain header assembly that is configured to be selectively positioned within an internal cabin of a vehicle. The curtain header assembly includes a main spanning bracket having a first end and a second end that is opposite from the first end. The main spanning bracket connects to a curtain track that retains one or more curtain couplings that are configured to moveably secure a curtain to the curtain track. A first connection arm extends from the first end of the main spanning bracket, and is configured to be removably secured to a first fitting secured to a first fixed structure within the internal cabin. A second connection arm extends from the second end of the main spanning bracket, and is configured to be removably secured to a second fitting secured to a second fixed structure within the internal cabin.

The first fixed structure may include a first strongback. Similarly, the second fixed structure may include a second strongback. In at least one embodiment, the first connection arm is configured to extend through a first gap formed between the first strongback and a first pivot bin pivotally coupled relative to the first strongback when the first pivot bin is in open and closed positions. Similarly, the second connection arm is configured to extend through a second gap formed between the second strongback and a second pivot bin pivotally coupled to the second strongback when the second pivot bin in open and closed positions.

In at least one embodiment, one or both of the first connection arm and the second connection arm are configured to be linearly moved in relation to the main spanning bracket to adjust a length of the curtain header assembly.

In at least one embodiment, the first connection arm includes a first fitting coupler that is configured to removably couple to the first fitting, and the second arm includes a second fitting coupler that is configured to removably couple to the second fitting. The first fitting coupler may be configured to rotate relative to the first fitting coupler to pivotally adapt the curtain header assembly to the first fitting. Similarly, the second fitting coupler may be configured to rotate relative to the second fitting coupler to pivotally adapt the curtain header assembly to the second fitting. In at least one embodiment, the first fitting coupler and the second fitting coupler include connection sockets that are configured to retain reciprocal portions of the first fitting and the second fitting, respectively.

One or both of the first fitting and the second fitting may include a main housing defining an internal chamber, a door coupled to the main housing (wherein the door is configured to be opened to expose the internal chamber), and a button within the internal chamber. The button is operatively coupled to a header engager that is configured to removably couple to the first or second connection arm. The button is configured to be engaged to decouple the header engager from the first or second connection arm. In at least one embodiment, the header engager includes a spherical member that is configured to be retained within a reciprocal socket of the first or second connection arm. The first fitting and/or the second fitting may also include first indicia and second indicia that are configured to be compared to determine a proper connection with the first or second connection arm.

The curtain track may be removably coupled to the main spanning bracket. The curtain track may conceal the curtain couplings.

The curtain header assembly is configured to be selectively mounted and removed from a plurality of locations within the internal cabin. In at least one embodiment, the first fitting and the second fitting are concealed when the curtain header assembly is connected to and removed from the first fitting and the second fitting.

Certain embodiments of the present disclosure provide a method for selectively positioning a curtain header assembly within an internal cabin of a vehicle. The method includes retaining one or more curtain couplings within a curtain track connected to a main spanning bracket having a first end and a second end that is opposite from the first end, removably securing a first connection arm extending from the first end of the main spanning bracket to a first fitting secured to a first fixed structure within the internal cabin, and removably securing a second connection arm extending from the second end of the main spanning bracket to a second fixed structure within the internal cabin.

In at least one embodiment, the method also includes linearly moving one or both of the first connection arm and the second connection arm in relation to the main spanning bracket to adjust a length of the curtain header assembly. The method may also include pivotally adapting the curtain header assembly to one or both of the first fitting or the second fitting through one or both of a rotatable first fitting coupler of the first connection arm or a rotatable second fitting coupler of the second connection arm.

In at least one embodiment, the method also include pressing a button of the first fitting and the second fitting to disconnect the first connection arm and the second arm from the first fitting and the second fitting.

Certain embodiments of the present disclosure provide a vehicle that includes an internal cabin, an aisle extending through the internal cabin, a first fixed structure within the internal cabin on a first side of the aisle, a second fixed structure within the internal cabin on a second side of the aisle opposite from the first fixed structure, and an adaptable curtain-positioning securing system that includes (a) a first fitting secured to the first fixed structure, (b) a second fitting secured to the second fixed structure, and (c) a curtain header assembly that removably secures to the first fitting and the second fitting.

The curtain header assembly includes a main spanning bracket having a first end and a second end that is opposite from the first end. The main spanning bracket connects to a curtain track that retains one or more curtain couplings that are configured to moveably secure a curtain to the main spanning bracket. A first connection arm extends from the first end of the main spanning bracket, and arm removably secures to the first fitting. A second connection arm extends from the second end of the main spanning bracket, and removably secures to the second fitting.

DETAILED DESCRIPTION OF THE DISCLOSURE

Figure 1:
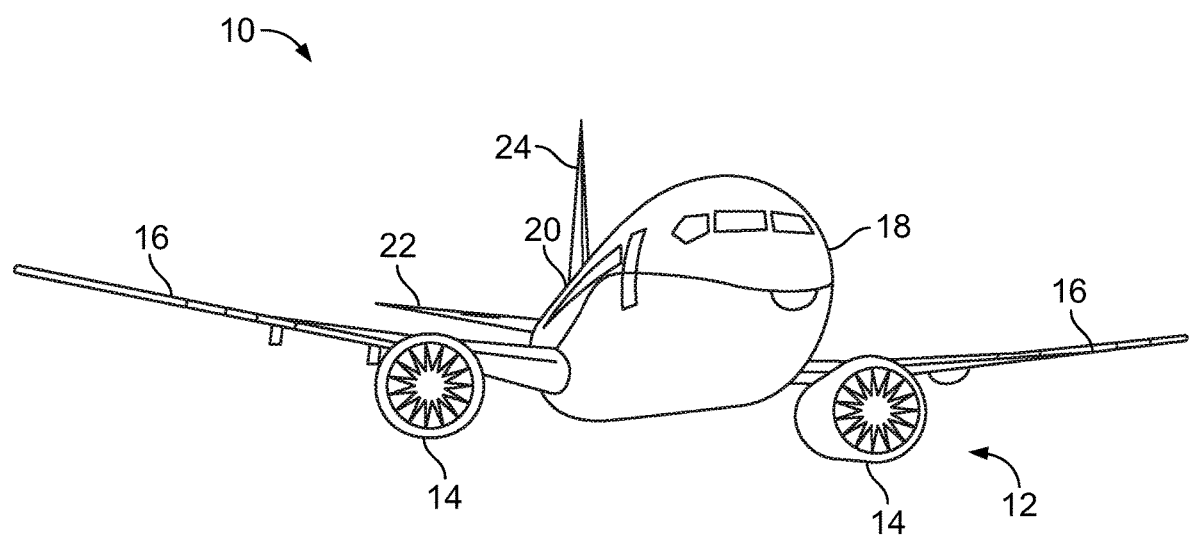
FIG. 1 illustrates a perspective front view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a curtain header assembly that is configured to attach to a curtain. The curtain header assembly is configured to be adaptively positioned within a cabin of a vehicle. In particular, the curtain header assembly is configured to be selectively positioned and repositioned over an aisle of the cabin. The curtain header assembly is quickly and easily detachable and attachable from fittings within the cabin. As such, the curtain header assembly is configured for quick and easy repositioning of a boundary (such as between different class sections) within an internal cabin of a vehicle.

In at least one embodiment, the curtain header assembly includes a first attachment portion at one end, and a second attachment portion art an opposite end. One or both of the first or second attachment portions includes a rotatable feature and/or a spring-biased feature that allow for quick connection and disconnection in relation to a fitting that is secured to a fixed structure.

Embodiments of the present disclosure provide systems and methods for selectively attaching a cross-aisle curtain header assembly to an interior of a vehicle. The curtain header assembly spans over an aisle and connects to two locations, one on either side of the aisle. The attachment points may be located outboard and/or above faces of pivot bins of stowage bin assemblies, such that when an attachment fitting is not in use, the attachment fitting may be hidden or otherwise shrouded from view.

Embodiments of the present disclosure provide a curtain header assembly that allows for quick and easy reconfiguration of passenger sections within an internal cabin of a vehicle, such as a commercial airplane. The curtain header assembly is relatively light and is cost-effective. The curtain header assembly provides an aesthetically-pleasing appearance, in which attachment fittings may be hidden from view. Further, in at least one embodiment, the curtain header assembly is tamper resistant in that attachment and detachment may require specific manipulation by an individual.

Embodiments of the present disclosure provide a curtain header assembly that is configured to be selectively positioned within an internal cabin of a vehicle. The curtain header assembly includes a main spanning bracket having a first end and a second end that is opposite from the first end. A first connection arm extends from the first end of the main spanning bracket. The first connection arm is configured to be removably secured to a first fitting secured to a first fixed structure within the internal cabin. A second connection arm extends from the second end of the main spanning bracket. The second arm is configured to be removably secured to a second fitting secured to a second fixed structure within the internal cabin.

The first and second connection arms are removably secured (for example, connected or otherwise coupled) to the first and second fittings, respectively, in that they may be quickly and easily connected to the first and second fittings without the need for tools, and/or without the need for separate and distinct fasteners (such as screws or bolts that are engaged with a tool). Instead, the first and second connection arms may be quickly connected to the first and second fittings, such as through portions of the first and second connection arms mating with reciprocal portions of the first and second fittings. Further, the first and second connection arms may be quickly disconnected from the first and second fittings, such as through an individual engaging a portion of the first and second connection arms and/or the first and second fittings by hand (such as by pressing a button, unlatching a latch, unhooking one portion from another, and/or the like).

FIG. 1 illustrates a perspective front view of an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which include a cockpit, one or more work sections (for example, galleys, personnel carry-on baggage areas, and the like), one or more passenger sections (for example, first class, business class, and coach sections), and an aft section. Each of the sections may be separated by a cabin transition area, which may include one or more cross-aisle curtain header assemblies coupled to moveable curtains, as described herein.

Alternatively, instead of an aircraft, embodiments of the present disclosure may be used with various other vehicles, such as automobiles, buses, locomotives and train cars, seacraft, spacecraft, and the like.

Figure 2A:
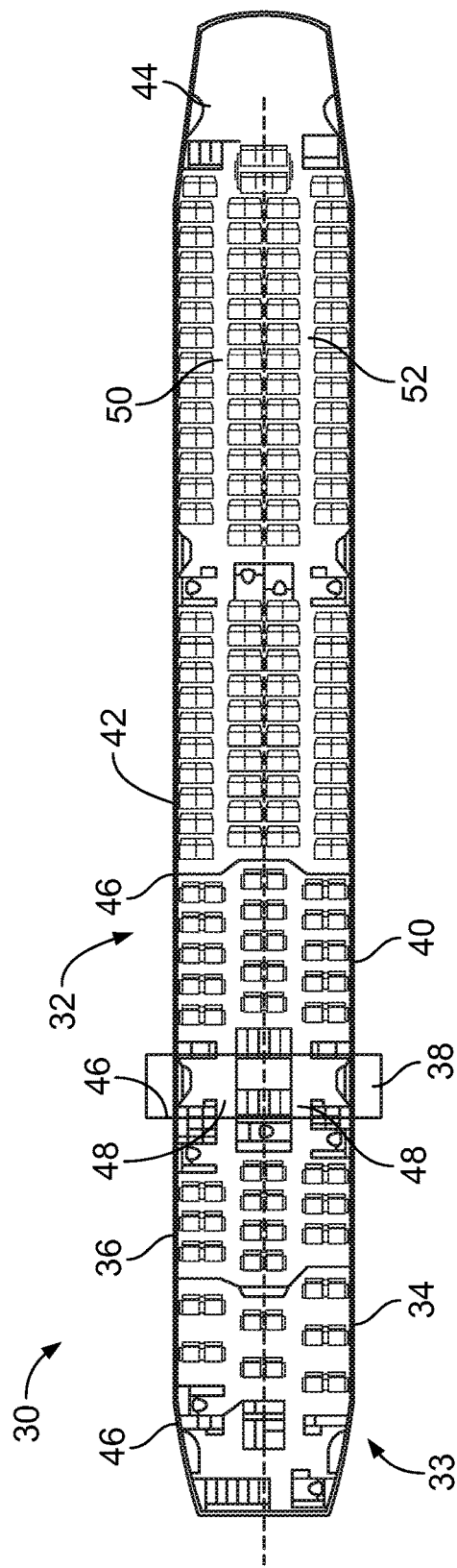
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft 10, shown in FIG. 1. For example, one or more fuselage walls may define the internal cabin 30. The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class/section divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
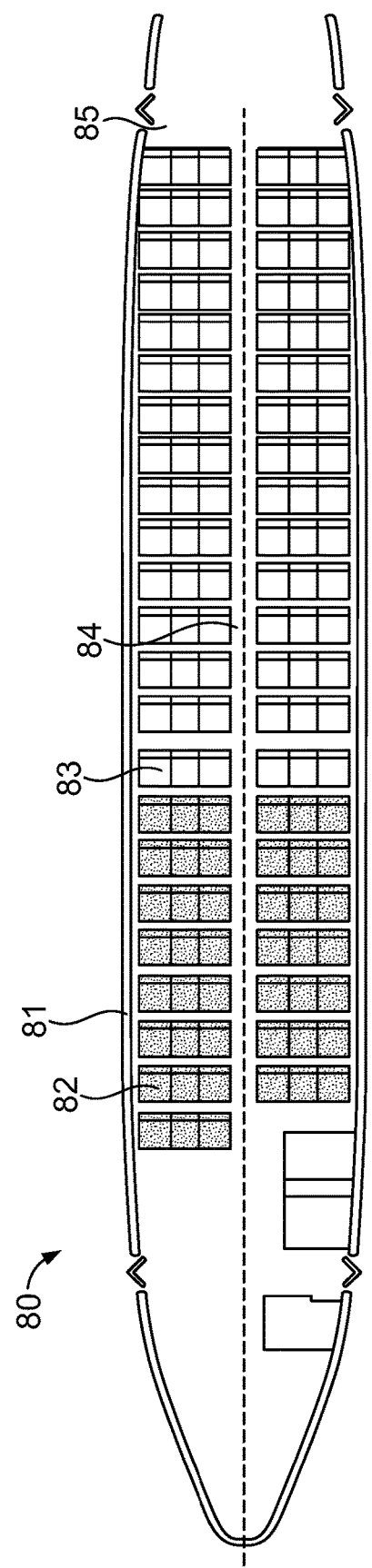
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft 10, shown in FIG. 1. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
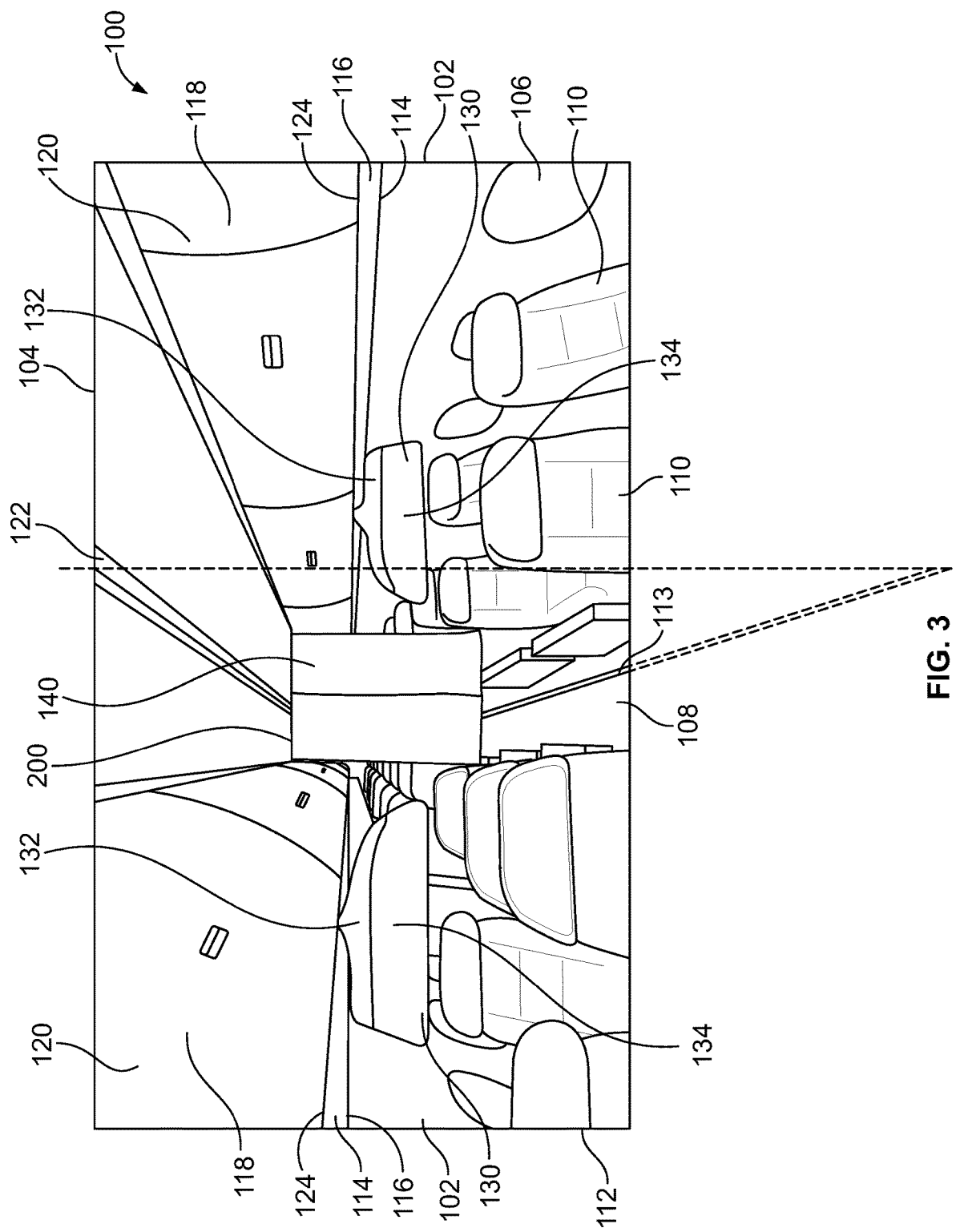
FIG. 3 illustrates a perspective interior view of an internal cabin of an aircraft, according to an embodiment of the present disclosure.

FIG. 3 illustrates a perspective interior view of an internal cabin 100 of an aircraft, according to an embodiment of the present disclosure. The internal cabin 100 includes outboard walls 102 connected to a ceiling 104. Windows 106 may be formed within the outboard walls 102. A floor 108 supports rows of seats 110. As shown in FIG. 3, a row 112 may include two seats 110 on either side of an aisle 113. However, the row 112 may include more or less seats 110 than shown. Additionally, the internal cabin 100 may include more aisles than shown.

Passenger service units (PSUs) 114 are secured between an outboard wall 102 and the ceiling 104 on either side of the aisle 113. The PSUs 114 extend between a front end and rear end of the internal cabin 100. For example, a PSU 114 may be positioned over each seat 110 within a row 112. Each PSU 114 may include a housing 116 that generally contains vents, reading lights, an oxygen bag drop panel, an attendant request button, and other such controls over each seat 110 (or groups of seats) within a row 112.

Overhead stowage bins 118 are secured to the ceiling 104 and/or the outboard wall 102 above and inboard from the PSU 114 on either side of the aisle. The overhead stowage bins 118 extend between the front and rear end of the internal cabin 100. Each overhead stowage bin 118 may include a pivot bin or bucket 120 pivotally secured to a strongback (hidden from view in FIG. 3), which may be or include a clamshell housing. The overhead stowage bins 118 may be positioned above and inboard from lower surfaces of the PSUs 114. The overhead stowage bins 118 are configured to be pivoted open in order to accept passenger carry-on luggage, for example.

As used herein, the term "outboard" means a position that is further away from a central longitudinal plane 122 (may also be referred to as buttock line zero) of the internal cabin 100 as compared to another component. The term "inboard" means a position that is closer to the central longitudinal plane 122 of the internal cabin 100 as compared to another component. For example, a lower surface of a PSU 114 may be outboard in relation to a stowage bin 118.

The terms inboard and outboard as used herein refer to the orientations shown in the Figures. It is to be understood that an inboard structure may be an outboard structure, and vice versa, depending on a position of a stowage bin assembly, monument, or the like in relation to another portion of the aircraft.

As shown, a gap 124 extends along a length of the internal cabin 100 between the PSU 114 and the stowage bins 118 on each side of the aisle 113. The gap 124 allows the buckets 120 of the stowage bins 118 to be pivoted between open and closed positions.

A section divider assembly 130 may be positioned within the internal cabin 100 to define different sections therein. For example, the section divider assembly 130 may be positioned over one or more seats 110 within a row 112. Each section divider assembly 130 may include an attachment header 132 that securely connects to a downwardly-extending barrier 134.

The internal cabin 100 also includes a moveable curtain 140 extending downwardly from the ceiling 104 within the aisle 113. The curtain 140 is moveably secured to a curtain header assembly 140 that spans the aisle 113. The curtain header assembly 140 may be positioned over the aisle 113, as shown. The curtain header assembly 140 allows the curtain 140 to be moved between open and closed positions in relation to the aisle. In the closed position, the curtain 140 provides a noticeable barrier within the aisle that indicates that passengers should not move therethrough. In contrast, the curtain 140 in the open position provides an open passage through the aisle indicating that passengers are able to freely move therethrough. As described herein, the curtain header assembly 140 allows the curtain 140 to be quickly and easily positioned and repositioned at different locations along the aisle 113.

Figure 4:
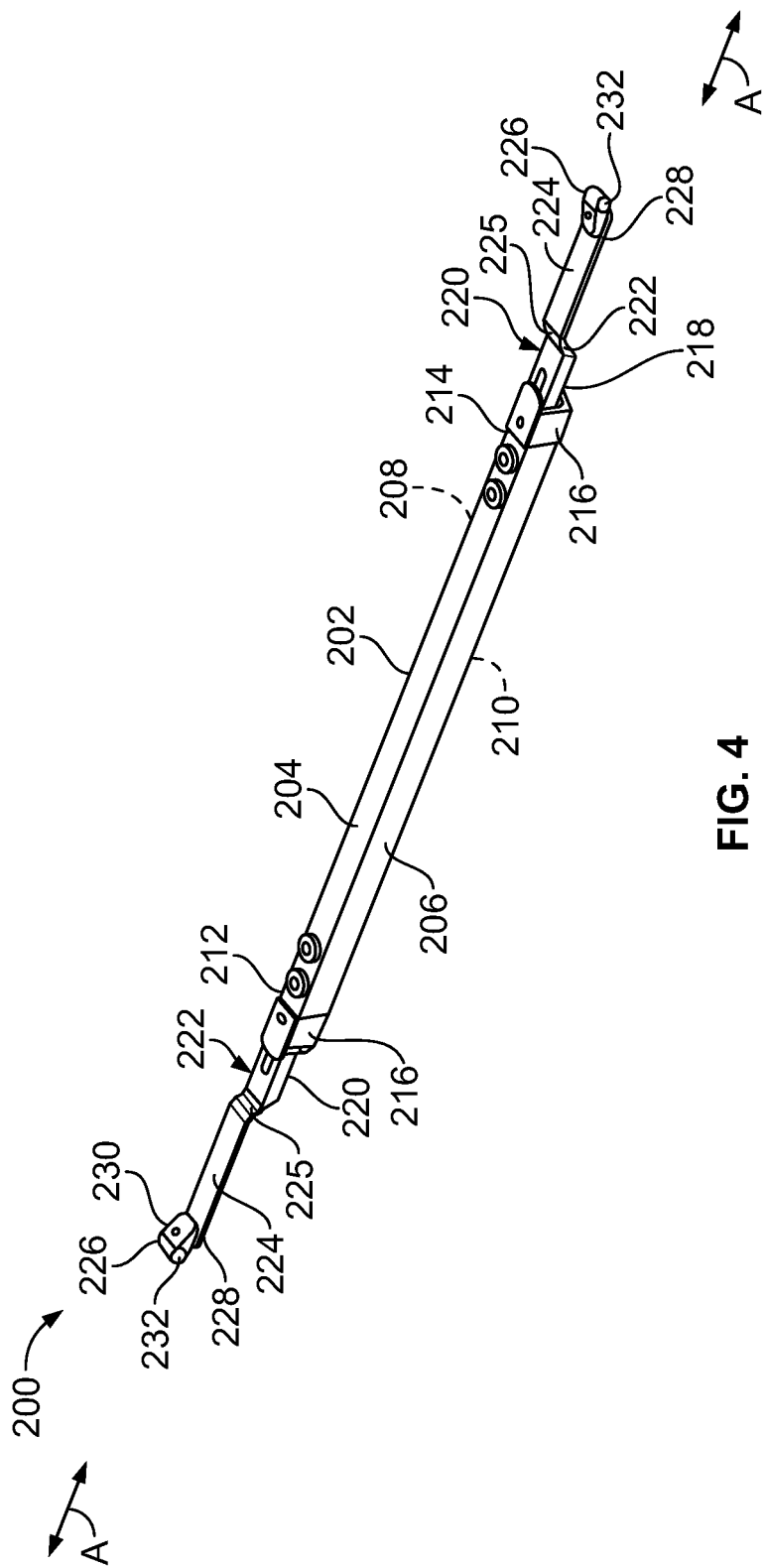
FIG. 4 illustrates a perspective top view of a curtain header assembly, according to an embodiment of the present disclosure.

FIG. 4 illustrates a perspective top view of a curtain header assembly 200, according to an embodiment of the present disclosure. The curtain header assembly 200 includes a main spanning bracket 202 that includes a top panel 204 connected to a front panel 206, a rear panel 208, and a lower panel 210. A curtain track (hidden from view in FIG. 4) is formed through the lower panel 210. A longitudinal chamber may be formed through the main spanning bracket 202 between a first end 212 and an opposite second end 214. The main spanning bracket 202 connects to the curtain track. For example, the main spanning bracket 202 may include the curtain track, or may be coupled to the curtain track.

End caps 216 may be secured to the first end 212 and the second end 214, respectively. The end caps 216 may be separate and distinct structures that are secured to the main spanning bracket 202. Optionally, the end caps 216 may be integrally formed with the main spanning bracket 202. The end caps 216 include passages 218 formed therethrough that receive and retain portions of connection arms 220.

The connection arms 220 outwardly extend from the end caps 216. The connection arms 220 include a coupling portion or beam 222 that extends into the end cap 216 and the main spanning bracket 202. The coupling beam 222 connects to a connection portion or beam 224, which may be upwardly offset from the coupling beam 222 by an arcuate or canted intermediate beam 225. Optionally, the intermediate beam 225 may be downwardly canted or curved to downwardly offset the connection beam 224 from the coupling beam 222. In at least one other embodiment, the coupling beam 222 and the connection beam 224 may be coaxial. In this manner, the connection arm 220 may include a single, linear beam that includes a coupling portion or beam that connects to the main spanning bracket 202 and a connection portion or beam that is configured to securely connect to a fitting, as described herein.

Fitting couplers 226 are rotatably secured to distal ends 228 of the connection beams 224. For example, the fitting couplers 226 may be rotatably secured to the connection arms 220 via pins of lugs (hidden from view in FIG. 4). In this manner, the fitting couplers 226 may pivot about axes 230 of the pins to adapt to a position of the curtain header assembly 200 in relation to fittings. The fitting couplers 226 include connection sockets 232 that are configured to receive and retain a reciprocal element (such as a ball) of a fitting. Optionally, the fitting couplers 226 may connect to a fitting through other connections, such as a tab and slot, a pin and groove, and/or the like.

Figure 5:
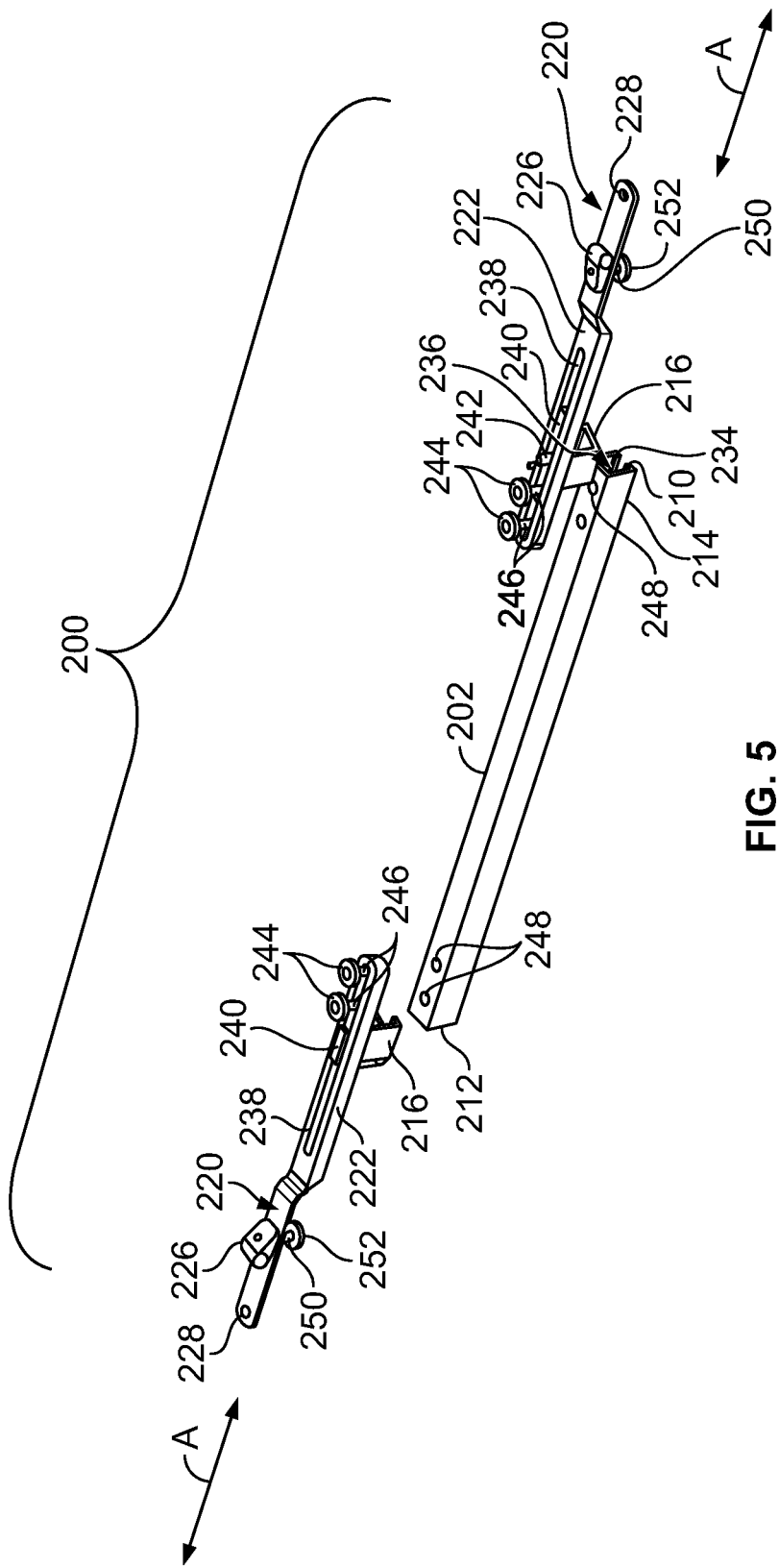
FIG. 5 illustrates a perspective top, exploded view of a curtain header assembly, according to an embodiment of the present disclosure.

FIG. 5 illustrates a perspective top, exploded view of the curtain header assembly 200. The curtain track 234 is formed through the lower panel 210. The longitudinal chamber 236 is formed through the main spanning bracket 202 between the first end 212 and the second end 214.

A longitudinal slot 238 is formed along at least a portion of a length of the coupling beam 220 of the connection arm 220. The end cap 216 connects to an underside of the coupling beam 220 through a mounting tab 240 and a pin 242 that extends through the mounting tab 240 and the coupling beam 220 and into a the end cap 216. Optionally, the end cap 216 may connect to the coupling beam 220 through the pin 242 (or another such fastener) without the mounting tab 240.

One or more lugs 244 connect the coupling beam 220 to the main spanning bracket 202. For example, the lugs 244 include pins 246 that extend through the longitudinal slot 238 of the coupling beam 222 and into through holes 248 formed through the top panel 204 of the main spanning bracket 202. Optionally, the main spanning bracket 202 may secure to the coupling beams 220 through more or less lugs 244 than shown.

Because the pins 242 and 246 are positioned within the longitudinal slots 238, the connection arms 220 may inwardly and outwardly move in relation to main spanning bracket 202 in the directions of arrows A. Such longitudinal translation in the direction of arrows A is limited by the length of the longitudinal slots. In this manner, the length of the curtain header assembly 200 may be adaptively adjusted depending on a width of an aisle or distance between two fixation points, for example. In at least one embodiment, a spring may be positioned within a longitudinal slot 238 and may abut into an interior wall of the coupling beam 222 and the end cap 216, or a pin. In this manner, the connection arms 220 may be spring-biased into a retracted (or optionally, extended) position.

Optionally, the connection arms 220 may be configured to move in relation to the main spanning bracket 202 through other type of moveable connections. For example, the connection arms 220 may be configured to telescope into and out of the main spanning bracket 202. As another example, the connection arms 220 may be or include articulating segments that are configured to fold into and away from one another. As another example, the connection arms 220 may be tubular structures that slide into and out of the main spanning bracket 202. As another example, the connection arms 220 may include bellows that allow the connection arms 220 to move in an accordion-like motion in relation to the main spanning bracket 202.

As shown, both of the connection arms 220 may be longitudinally adjustable relative to the main spanning bracket 202 via the longitudinal slots 238. That is, each of the connection arms 220 may be slid into or out of the main spanning bracket 202 to adaptively adjust a length of the curtain header assembly 200. Optionally, only one of the connection arms 220 may be longitudinally adjustable relative to the main spanning bracket 202, while an opposite connection arm 220 is fixed in position relative to the main spanning bracket 202.

The fitting couplers 226 are rotatably secured to the distal ends 228 of the connection beams 224 via the pins 250 of the lugs 252. In this manner, the fitting couplers 226 may pivot about the axes 230 of the pins 250 to adapt to a position of the curtain header assembly 200 in relation to fittings.

Referring again to FIG. 4, as described, one or both of the connection arms 220 may be slid into or out of the main spanning body 202 to adjust a length of the curtain header assembly 200. As such, the length of the curtain header assembly 200 may be adjusted to accommodate sections of aisles that have different widths. Further, the fitting couplers 226 may rotate about the axes 230 of the pins 250 of the lugs 252 to adapt to a position of a fitting. In this manner, the fitting couplers 226 allow the curtain header assembly 200 to pivotally adjust to fittings across an aisle that may be axially offset from one another.

Figure 6:
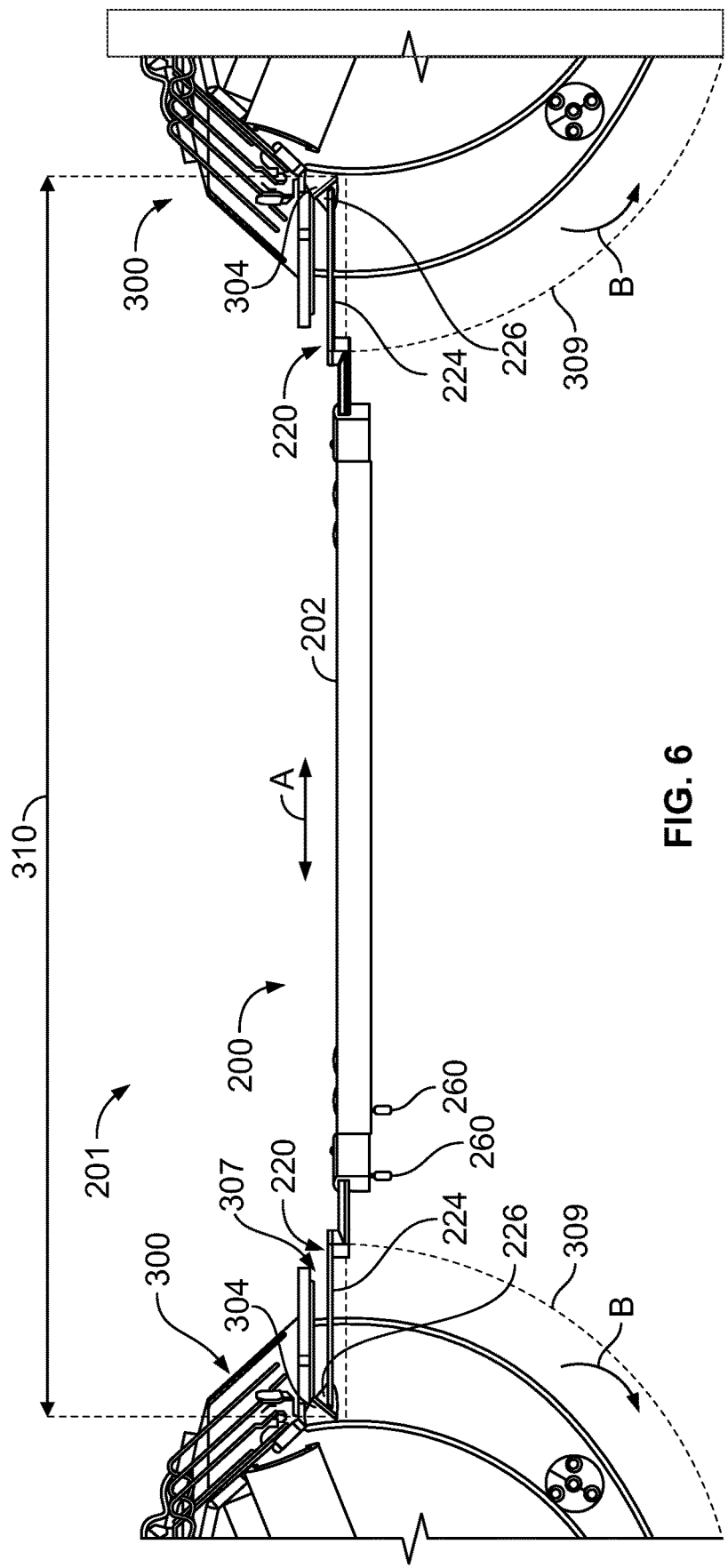
FIG. 6 illustrates a perspective front view of a curtain header assembly secured between strongbacks of stowage bin assemblies, according to an embodiment of the present disclosure.
Figure 7:
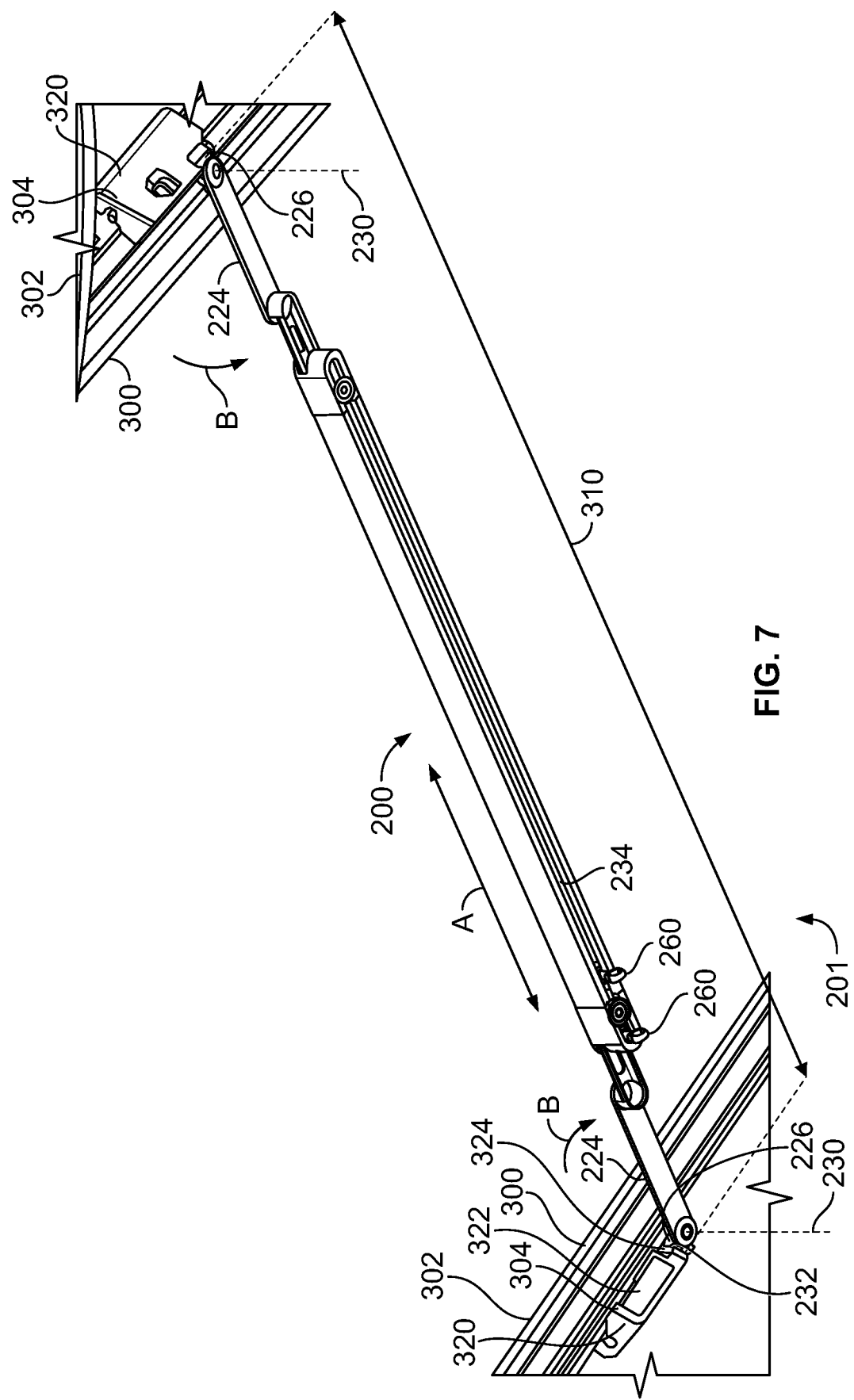
FIG. 7 illustrates a perspective bottom view of a curtain header assembly secured between strongbacks of stowage bin assemblies, according to an embodiment of the present disclosure.

FIG. 6 illustrates a perspective front view of the curtain header assembly 200 secured between strongbacks 300 of stowage bin assemblies 302, according to an embodiment of the present disclosure. FIG. 7 illustrates a perspective bottom view of the curtain header 200 assembly secured between the strongbacks 300. For the sake of clarity, the pivot bins (such as the pivot bins 120 shown in FIG. 3) of the stowage bin assemblies 302 are not shown in FIGS. 6 and 7. The pivot bins are configured to pivot into an open position in relation to the strongbacks 300 in the directions of arcs B.

Fittings 304 are secured to upper portions of the strongbacks 300. The connection beams 224 of the connection arms 220 are thin enough to fit between gaps formed between the upper portions of the strongbacks 300 and the pivot bins in the closed position. The connection arms 220 may extend through the gaps formed between the strongbacks 200 and pivot bins pivotally coupled to the strongbacks 200 when the pivot bins are in open and closed. As such, the fittings 304 are hidden from view when the pivot bins are closed, whether or not the connection beams 224 are secured thereto.

As shown in FIG. 6, the connection arms 220 extend through gaps 307 between the strongbacks 300 and pivot bins 309 (shown in dashed lines) in closed positions. The curtain header assembly 200 remains secured in position to the fittings 304 when the pivot bins 309 are in closed and open positions, Notably, when the curtain header assembly 200 is removed from a location, the fittings 304 do not protrude outwardly from the stowage bin assemblies, for example. Instead, the fittings 304 may be disposed within the stowage bin assemblies (such as secured to the strongbacks 200 and hidden from view when the pivot bins 309 are closed.

As shown in FIGS. 6 and 7, embodiments of the present disclosure provide an adaptable curtain-positioning securing system 201 that includes the curtain header assembly 200 and the fittings 304. The fittings 304 are secured to fixed structures within an internal cabin, such as, for example, the strongbacks 300 on opposite sides of an aisle.

Referring to FIGS. 4-7, curtain couplings 260 (such as rings, rods, or the like) are moveably coupled to the curtain track 234. Additional curtain couplings 260 may also be used. The curtain couplings 260 secure the curtain 140 (shown in FIG. 3) to the curtain header assembly 200.

As shown, the fittings 304 are secured to fixed structures within an internal cabin, such as between the two strongbacks 300. Optionally, the fittings 304 may be secured to various other portions, such as a fixed portion of a monument, a ceiling, a wall, or the like. As an example, one fitting 304 may be secured to a strongback 300, while another fitting 304 may be secured to a wall portion of a galley or lavatory within an internal cabin.

In order to secure the curtain header assembly 200 to the fittings 304, a fitting coupler 226 of one connection arm 226 is first secured to one of the fittings 304. The opposite fitting coupler 226 is then moved into a connection position with the opposite fitting 304. During such movement, the length of the curtain header assembly 200 may be adjusted by way of one or both of the connection arms 220 longitudinally moving relative to the main spanning bracket 202 in the directions of arrows A (for example, either lengthening or shortening the curtain header assembly 200) to adapt to the distance between the fittings 304. Further, the fitting couplers 226 may rotate about the axes 230 to adaptively pivot the curtain header assembly 200 to the positions of the fittings 304 (such as if one fitting 304 is fore or aft the opposite fitting 304). As such, the curtain header assembly 200 adapts to the positions of the fittings 304.

The fittings 304 include a main housing 320 secured to a fixed structure within an internal cabin. The main housing 320 may include a door 322 that is configured to be opened. In the open position, an internal chamber is exposed. A button within the internal chamber is exposed when the door is in the open position. The button couples to a header engager, such as spherical member 324 (such as ball, or semispherical structure) that is retained within the connection socket 232 of the fitting coupler 226. The spherical member 324 may be outwardly spring-biased toward the connection socket 232 in at-rest position, thereby ensuring that the spherical member 324 is securely retained within the connection socket 232 (and the connection arm 220 is secured to the fitting 304). By pressing the button, the spherical member 324 is inwardly pulled out of the connection socket 232, thereby releasing the connection arm 220 from the fitting 304. When the button is released, the spherical member 324 returns to an outward, at-rest position, such as through a spring force. As such, the curtain header assembly 200 may be quickly and easily connected and disconnected from the fittings 304.

The main housing 320 of the fitting 304 may conceal the button therein, as noted. As such, the buttons may be protected from inadvertent engagement, thereby ensuring that the curtain header assembly 200 does not inadvertently disconnect from the fitting 304. Optionally, the fittings 304 may include buttons that are not concealed. As another example, the fittings 304 may connect to the fitting couplers 226 through various other header engagers or connection interfaces, such as latches, tabs and slots, hooks, clamps, and/or the like. In at least one embodiment, the fittings 304 may include header engagers in the form of connection sockets, while the fitting couplers 226 include balls or other such structures that are retained within the connection sockets.

Figure 8:
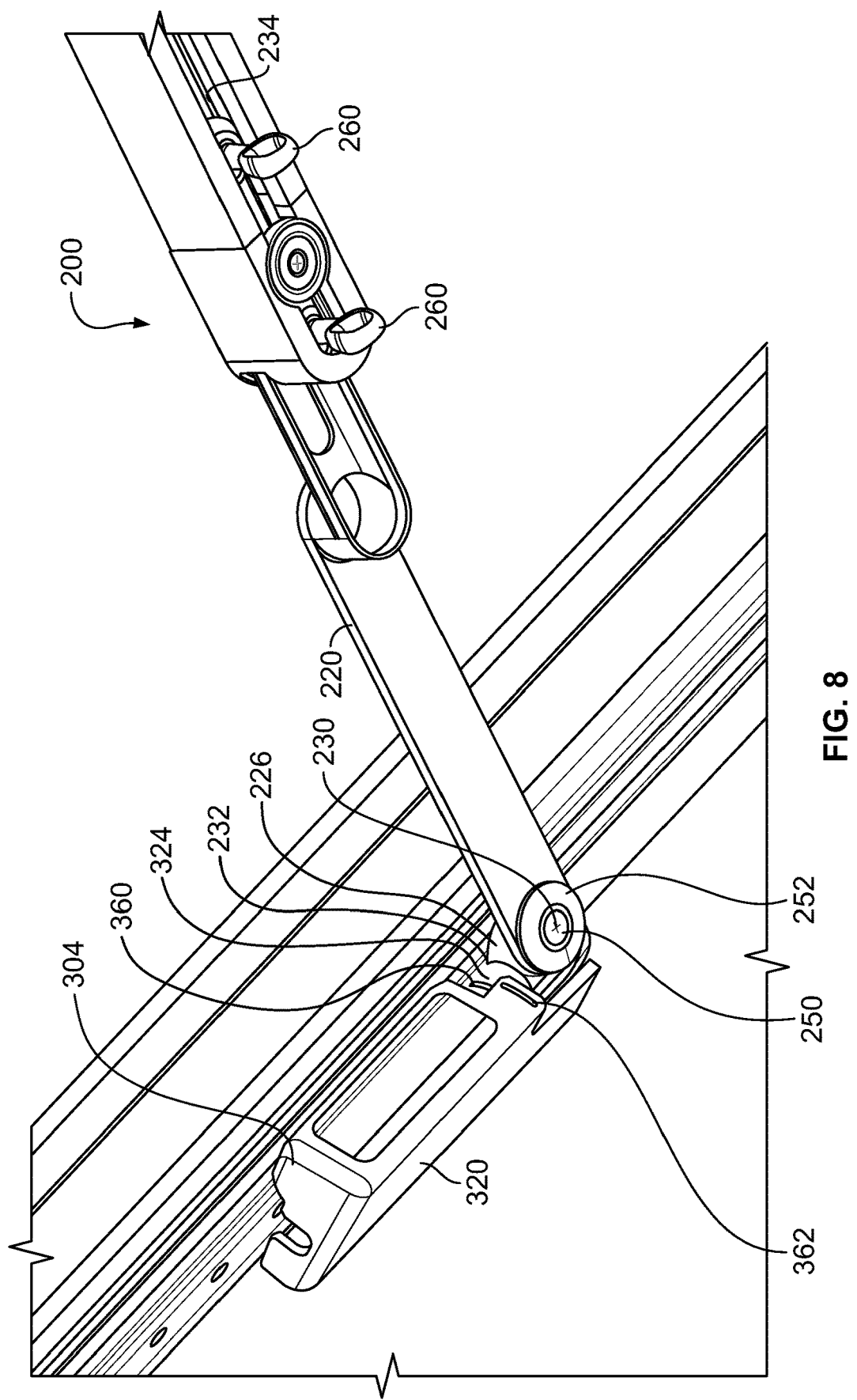
FIG. 8 illustrates a perspective bottom view of a connection arm of a curtain header assembly secured to a fitting, according to an embodiment of the present disclosure.
Figure 9:
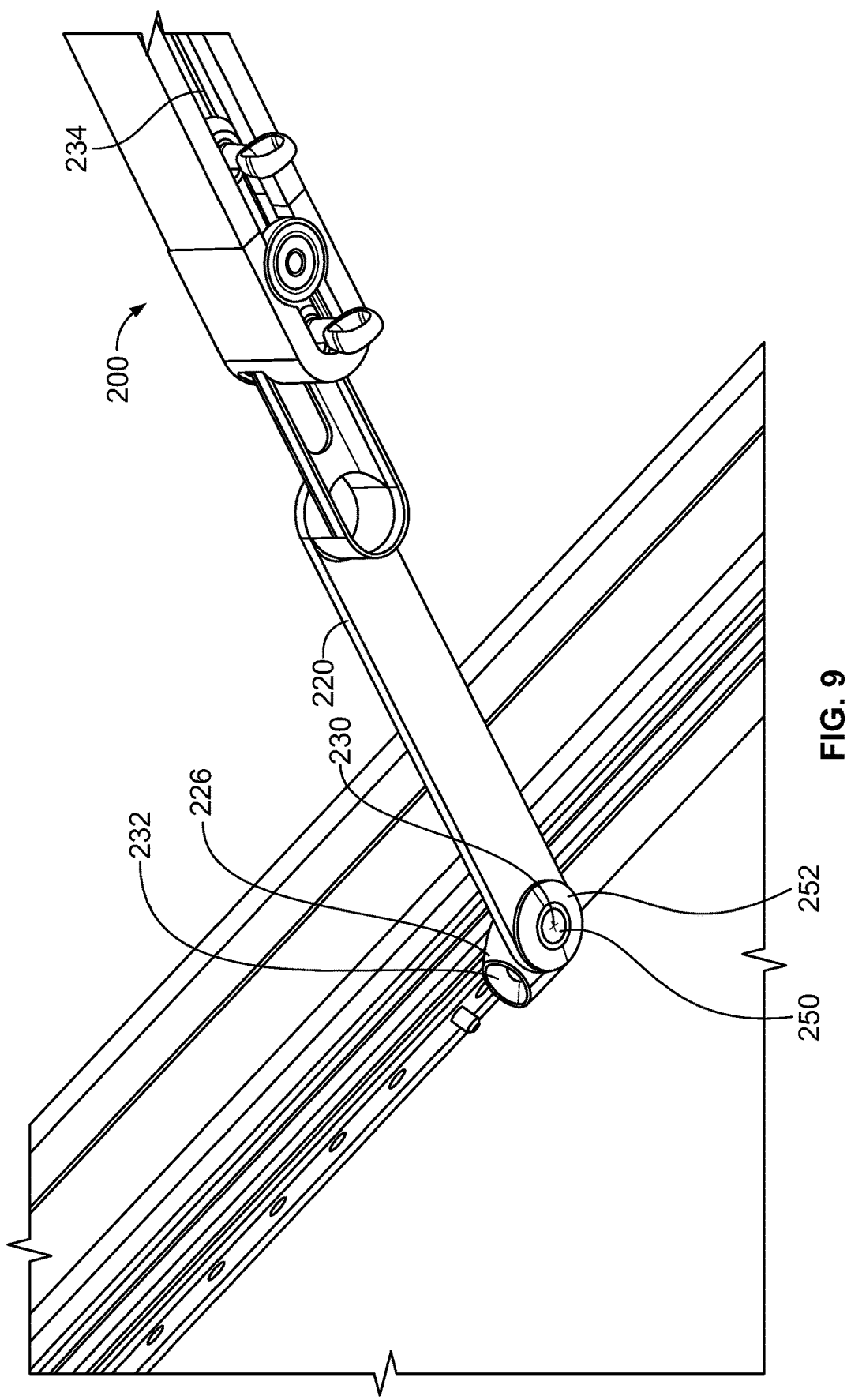
FIG. 9 illustrates a perspective bottom view of a connection arm of a curtain header assembly, according to an embodiment of the present disclosure.

FIG. 8 illustrates a perspective bottom view of a connection arm 220 of the curtain header assembly 200 secured to a fitting 304, according to an embodiment of the present disclosure. FIG. 9 illustrates a perspective bottom view of the connection arm 200 of the curtain header assembly 200. Referring to FIGS. 8 and 9, the connection arm 220 is secured to the fitting 304 by way of the spherical member 324 of the fitting 304 being retained within the connection socket 232 of the fitting coupler 226. The spherical member 324 may include indicia 360 (such as line or ring) that aligns with indicia 362 of the main housing 320 (such as a line or ring) when the fitting coupler 226 is properly secured to the spherical member 324. In this manner, an individual may quickly and easily view the indicia 360 in relation to the indicia 362 to determine whether the connection arm 220 is properly secured to the fitting 304. If the indicia 360 and 362 are properly aligned (such as in a coaxial or collinear relationship), the connection arm 220 is properly secured to the fitting 304. If the indicia 360 and 362 are not aligned (such as if the spherical member 360 is not fully inserted into the connection socket 232), then an individual may readily view the misalignment and determine that the connection arm 220 is not properly secured to the fitting 304.

Figure 10:
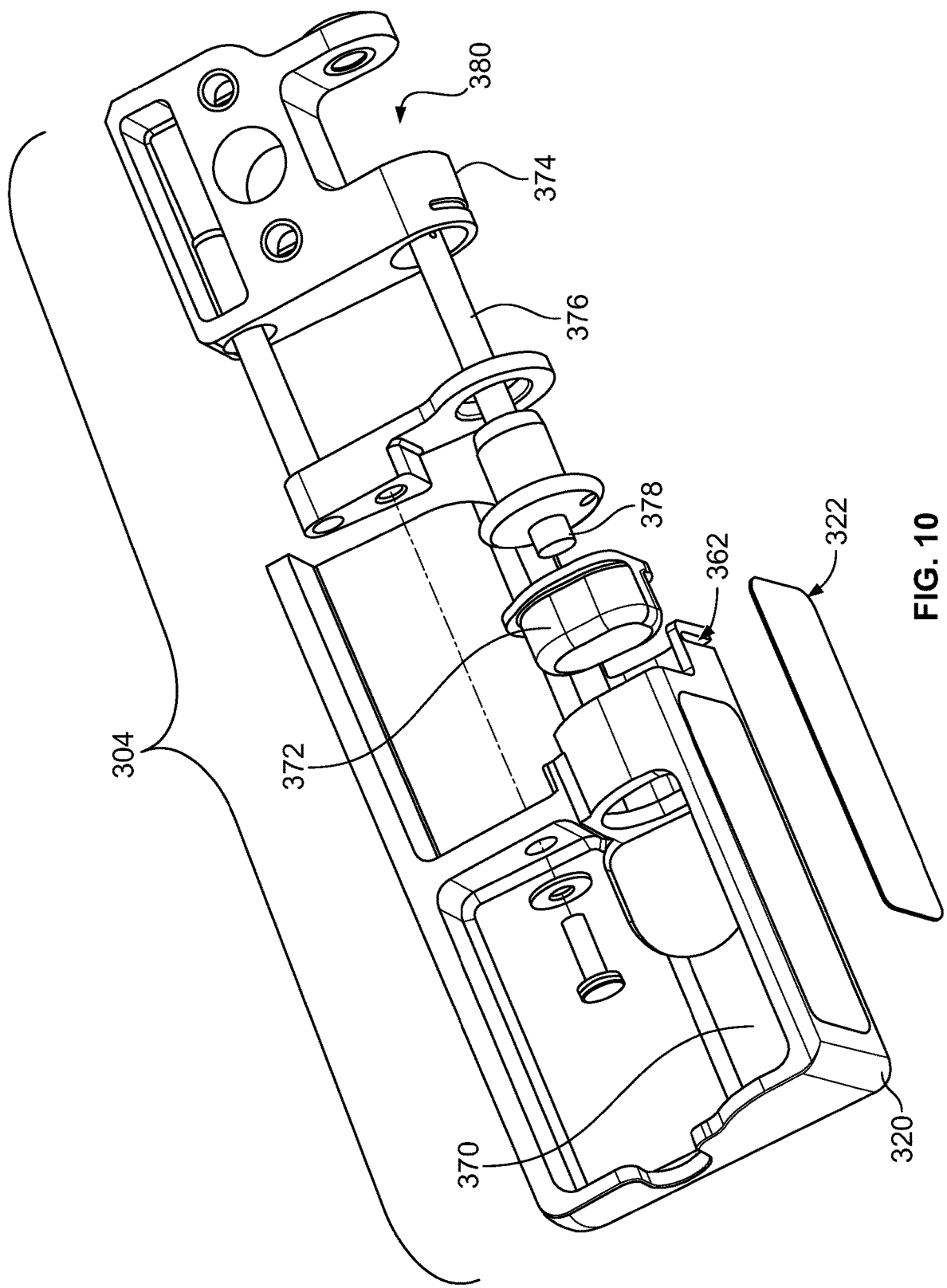
FIG. 10 illustrates a perspective exploded view of a fitting, according to an embodiment of the present disclosure.

FIG. 10 illustrates a perspective exploded view of a fitting 304, according to an embodiment of the present disclosure. The main housing 320 may include the door 322 that is configured to be opened to expose the internal chamber 370. A button 370 within the internal chamber is exposed when the door is in the open position. The button 370 couples to a spherical member within a sleeve 374, such as through a plunger 376. The plunger 376 may include an end 378 that is spring-biased in relation to the button 372, in order to extend the spherical member into a coupler gap 380.

Referring to FIGS. 7-10, when the fitting coupler 226 is urged into the coupler gap 380, the fitting coupler 226 forces the spherical member 324 back into the sleeve 374 until the spherical member 324 is aligned within the connection socket 232, at which point, the spherical member 324 is biased into the connection socket 232 to secure the fitting 304 to the connection arm 220. The spherical member 324 may be outwardly spring-biased toward the connection socket 232 in at-rest position, thereby ensuring that the spherical member 324 is securely retained within the connection socket 232 (and the connection arm 220 is secured to the fitting 304). By pressing the button 372, the spherical member 324 is inwardly pulled out of the connection socket 232, thereby releasing the connection arm 220 from the fitting 304. When the button 372 is released, the spherical member 324 returns to an outward, at-rest position, such as through a spring force. As such, the curtain header assembly 200 may be quickly and easily connected and disconnected from the fittings 304.

Figure 11:
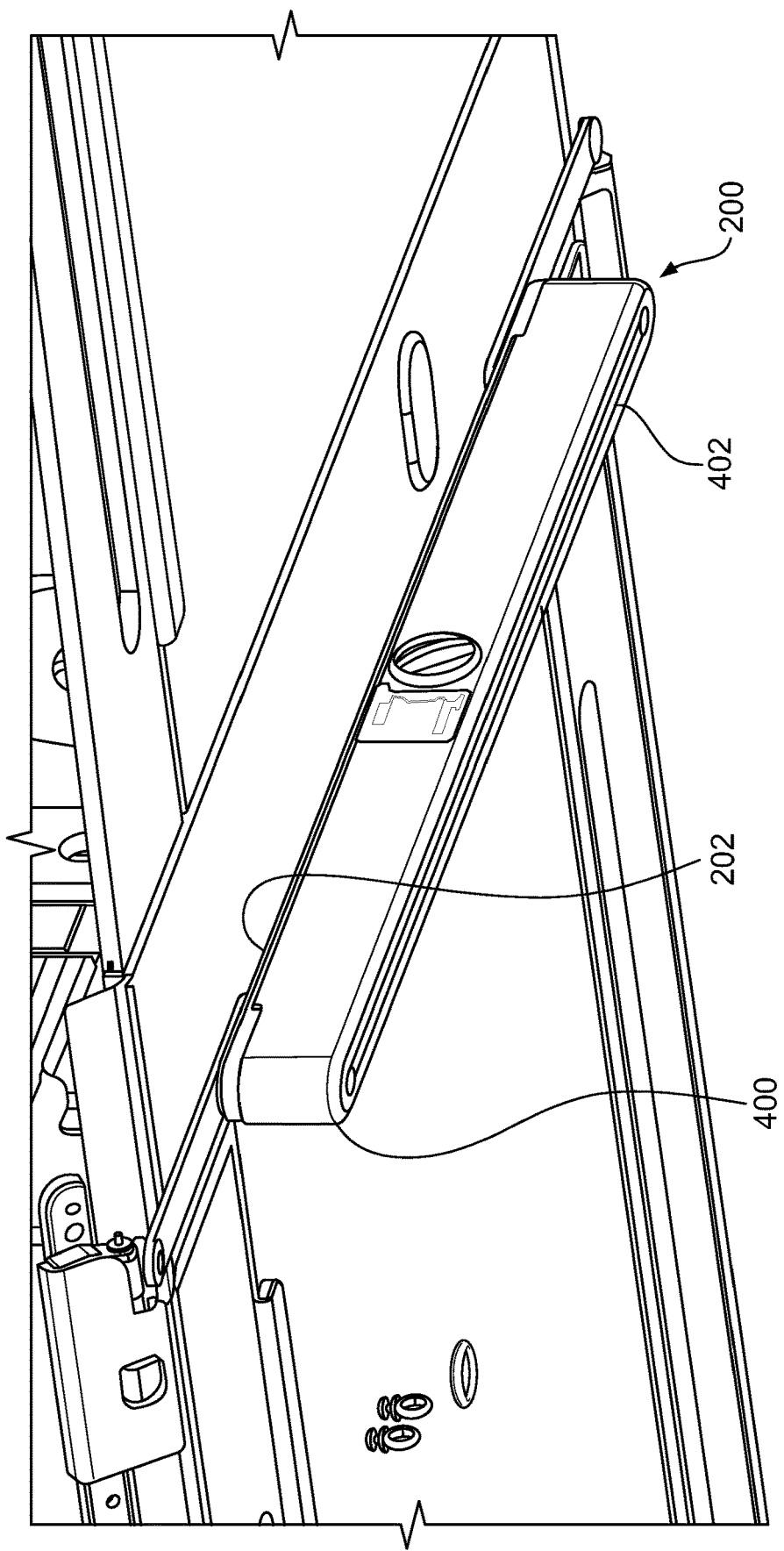
FIG. 11 illustrates a perspective bottom view of a curtain track secured to a main spanning body of a curtain header assembly, according to an embodiment of the present disclosure.

FIG. 11 illustrates a perspective bottom view of a curtain track 400 secured to the main spanning body 202 of the curtain header assembly 200, according to an embodiment of the present disclosure. In at least one embodiment, the curtain header assembly 200 includes the curtain track 400, which may be secured to a bottom portion of the main spanning body 202. For example, the curtain track 400 may snapably, latchably, or otherwise removably secure to the main spanning body 202. Optionally, the curtain track 400 may secure to the main spanning body 202 through one or more fasteners, adhesives, and/or the like.

In at least one embodiment, the curtain track 400 is used in place of the curtain track 234 (shown in FIGS. 7-9). In at least one other embodiment, the curtain track 400 includes a housing 402 that aligns with the curtain track 234 (shown in FIGS. 7-9) of the main spanning body 202. The curtain couplings 260 (shown in FIGS. 7-9) are concealed by the curtain track 400. Optionally, the curtain track 400 may include the curtain couplings 260. As such, the housing 402 of the curtain track 400 may improve the aesthetics of the curtain header assembly 200, such as by hiding interior components (such as the curtain couplings 260). The curtain tack 400 may be selectively coupled and uncoupled from the main spanning body 202. Optionally the curtain header assembly 200 may not include the curtain track 400.

Figure 12:
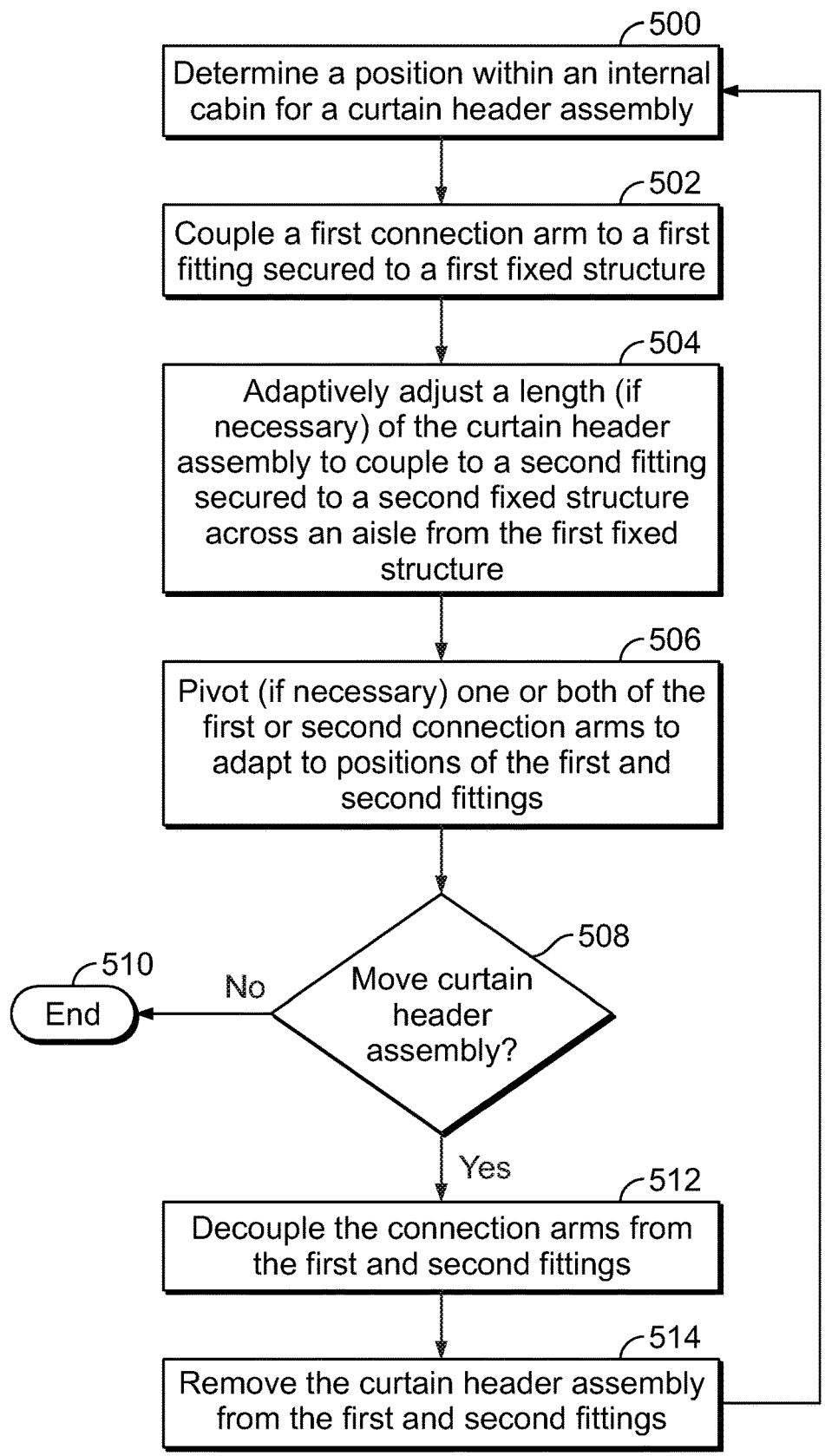
FIG. 12 illustrates a flow chart of a method of selectively positioning a curtain header assembly within an internal cabin of a vehicle, according to an embodiment of the present disclosure.

FIG. 12 illustrates a flow chart of a method of selectively positioning a curtain header assembly within an internal cabin of a vehicle, according to an embodiment of the present disclosure. The method begins at 500, at which an individual determines a position within an internal cabin for a curtain header assembly. At 502, a first connection arm is then coupled to a first fitting secured to a first fixed structure within the determined position of the internal cabin. Next, at 504, a length of the curtain header assembly is adaptively adjusted (if necessary) to couple a second fitting secured to a second fixed structure across an aisle from the first fixed structure. At 506, one or both of the connection arms are then pivoted (if necessary) to adapt to positions of the first and second fittings in relation to one another.

At 508, an individual determines whether to move the curtain header assembly, such as between legs of a flight. If not, the method ends at 510.

If, however, the curtain header assembly is to be moved at 508, the method proceeds to 512, at which the connection arms are decoupled from the first and second fittings (such as by engaging buttons of the first and second fittings to disconnect the fittings from fitting couplers of the connection arms). At 514, the curtain header assembly is then removed from the first and second fittings. The method then returns to 500.

As described herein, embodiments of the present disclosure provide a curtain header assembly that is configured to be removably connected to fittings within an internal cabin. The curtain header assembly includes connection arms that may be linearly adjusted to change an overall length of the curtain header assembly to adapt to aisle segments of different widths. Fitting couplings on the connection arms are configured to pivotally move to adapt the curtain heard assembly to fittings that may be longitudinally offset from one another in relation to a longitudinal plane of the internal cabin.

Embodiments of the present disclosure provide a curtain header assembly that may be quickly and efficiently repositioned within an interior cabin of an aircraft. Further, a need exists for a curtain header assembly that may be quickly and easily moved by flight attendants between flights of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An adaptable curtain-positioning securing system, comprising:
   a first fitting securable to a first structure;
   a second fitting securable to a second structure, wherein one or both of the first fitting and the second fitting comprises:
      a main housing defining an internal chamber;
      a door coupled to the main housing, wherein the door is configured to be opened to expose the internal chamber; and
      a button within the internal chamber, wherein the button is operably coupled to a header engager; and
   a curtain header assembly, comprising:
      a main spanning bracket having a first end and a second end that is opposite from the first end;
      a curtain track connected to the main spanning bracket, wherein the curtain track retains one or more curtain couplings that are configured to moveably secure a curtain to the curtain track;
      a first connection arm extending from the first end of the main spanning bracket, wherein the first connection arm is removably securable to the first fitting; and
      a second connection arm extending from the second end of the main spanning bracket, wherein the second connection arm removably securable to the second fitting,
      wherein the header engager removably couples to the first or second connection arm, wherein the button is configured to be engaged to decouple the header engager from the first or second connection arm.

2. The adaptable curtain-positioning securing system of claim 1, wherein one or both of the first connection arm and the second connection arm are configured to be linearly moved in relation to the main spanning bracket to adjust a length of the curtain header assembly.

3. The adaptable curtain-positioning securing system of claim 1, wherein the header engager comprises a spherical member that is configured to be retained within a reciprocal socket of the first or second connection arm.

4. The adaptable curtain-positioning securing system of claim 1, wherein one or both of the first fitting and the second fitting further comprise first indicia and second indicia that are configured to be compared to determine a proper connection with the first or second connection arm.

5. The adaptable curtain-positioning securing system of claim 1, wherein the curtain track is removably secured to the main spanning bracket, wherein the curtain track conceals the curtain couplings.

6. The adaptable curtain-positioning securing system of claim 1, wherein the curtain header assembly is configured to be selectively mounted and removed from a plurality of locations within an internal cabin.

7. The adaptable curtain-positioning securing system of claim 1, wherein the first fitting and the second fitting are concealed when the curtain header assembly is connected to and removed from the first fitting and the second fitting.

8. The adaptable curtain-positioning securing system of claim 1, wherein the first fixed structure comprises a first strongback, and wherein the second fixed structure comprises a second strongback.

9. The adaptable curtain-positioning securing system of claim 8, wherein the first connection arm is configured to extend through a first gap formed between the first strongback and a first pivot bin pivotally coupled relative to the first strongback when the first pivot bin is in open and closed positions, and wherein the second connection arm is configured to extend through a second gap formed between the second strongback and a second pivot bin pivotally coupled to the second strongback when the second pivot bin in open and closed positions.

10. The adaptable curtain-positioning securing system of claim 1, wherein the first connection arm comprises a first fitting coupler that is configured to removably couple to the first fitting, and wherein the second arm comprises a second fitting coupler that is configured to removably couple to the second fitting.

11. The adaptable curtain-positioning securing system of claim 10, wherein the first fitting coupler and the second fitting coupler comprise connection sockets that are configured to retain reciprocal portions of the first fitting and the second fitting, respectively.

12. The adaptable, curtain-positioning securing system of claim 10, wherein the first fitting coupler is configured to rotate relative to the first fitting to pivotally adapt the curtain header assembly to the first fitting.

13. The adaptable curtain-positioning securing system of claim 12, wherein the second fitting coupler is configured to rotate relative to the second fitting to pivotally adapt the curtain header assembly to the second fitting.

14. A method for selectively positioning a curtain header assembly within an internal cabin of a vehicle, the method comprising:
retaining one or more curtain couplings within a curtain track connected to a main spanning bracket having a first end and a second end that is opposite from the first end;
removably securing a first connection arm extending from the first end of the main spanning bracket to a first fitting secured to a first fixed structure within the internal cabin;
removably securing a second connection arm extending from the second end of the main spanning bracket to a second fitting secure to a second fixed structure within the internal cabin; and
pressing a button of the first fitting and the second fitting to disconnect the first connection arm and the second arm from the first fitting and the second fitting.

15. The method of claim 14, further comprising linearly moving one or both of the first connection arm and the second connection arm in relation to the main spanning bracket to adjust a length of the curtain header assembly.

16. The method of claim 14, pivotally adapting the curtain header assembly to one or both of the first fitting or the second fitting through one or both of a rotatable first fitting coupler of the first connection arm or a rotatable second fitting coupler of the second connection arm.

17. The method of claim 14, further comprising concealing the curtain couplings with the curtain track that is removably coupled to the main spanning bracket.

18. A vehicle comprising:
an internal cabin;
an aisle extending through the internal cabin;
a first fixed structure within the internal cabin on a first side of the aisle;
a second fixed structure within the internal cabin on a second side of the aisle opposite from the first fixed structure; and
an adaptable curtain-positioning securing system that includes (a) a first fitting secured to the first fixed structure, (b) a second fitting secured to the second fixed structure, wherein one or both of the first fitting and the second fitting comprises: (i) a main housing defining an internal chamber; (ii) a door coupled to the main housing, wherein the door is configured to be opened to expose the internal chamber; and (iii) a button within the internal chamber, wherein the button is operably coupled to a header engager, and (c) a curtain header assembly that removably secures to the first fitting and the second fitting, wherein the curtain header assembly comprises:
a main spanning bracket having a first end and a second end that is opposite from the first end;
a curtain track connected to the main spanning bracket, wherein the curtain track retains one or more curtain couplings that are configured to moveably secure a curtain to the curtain track;
a first connection arm extending from the first end of the main spanning bracket, wherein the first connection arm removably secures to the first fitting; and
a second connection arm extending from the second end of the main spanning bracket, wherein the second connection arm removably secures to the second fitting,
wherein the header engager removably couples to the first or second connection arm, wherein the button is configure to be engaged to decouple the header engager from the first or second connection arm.

19. The vehicle of claim 18, wherein the first fixed structure comprises a first strongback, and wherein the second fixed structure comprises a second strongback.

20. The vehicle of claim 18, wherein one or both of the first connection arm and the second connection arm are configured to be linearly moved in relation to the main spanning bracket to adjust a length of the curtain header assembly, wherein the first connection arm comprises a first fitting coupler that is configured to removably couple to the first fitting, wherein the second arm comprises a second fitting coupler that is configured to removably couple to the second fitting, wherein the first fitting coupler is configured to rotate relative to the first fitting to pivotally adapt the curtain header assembly to the first fitting, and wherein the second fitting coupler is configured to rotate relative to the second fitting to pivotally adapt the curtain header assembly to the second fitting.

21. The vehicle of claim 18, wherein the header engager comprises a spherical member that is configured to be retained within a reciprocal socket of the first or second connection arm.

22. The vehicle of claim 18, wherein one or both of the first fitting and the second fitting further comprise first indicia and second indicia that are configured to be compared to determine a proper connection with the first or second connection arm.

* * * * *